United States Patent [19]

Gurr

[11] 4,296,462

[45] Oct. 20, 1981

[54] INVERTER CONTROLLER

[75] Inventor: George P. Gurr, Dunwoody, Ga.

[73] Assignee: Sangamo Weston, Inc., Atlanta, Ga.

[21] Appl. No.: 54,024

[22] Filed: Jul. 2, 1979

[51] Int. Cl.[3] ............................................. H02M 7/515
[52] U.S. Cl. ...................................... 363/96; 363/137;
307/3; 364/492; 340/310 A
[58] Field of Search .................................. 363/39–40,
363/43, 96, 137; 307/3, 11; 340/147 R, 310 R,
310 A; 364/492, 493, 483, 514

[56] References Cited

U.S. PATENT DOCUMENTS

| | | | |
|---|---|---|---|
| 3,359,551 | 12/1967 | Dennison | 340/310 |
| 3,359,551 | 12/1967 | Dennis on | 364/492 |
| 3,886,332 | 5/1975 | Petit et al. | 307/43 X |
| 3,949,374 | 4/1976 | Takagi et al. | 364/200 |
| 3,972,470 | 8/1976 | Takagi | 364/492 |
| 4,060,735 | 11/1977 | Pascucci et al. | 340/310 A |
| 4,064,485 | 12/1977 | Leyde | 340/147 R |
| 4,075,699 | 2/1978 | Schneider et al. | 364/492 |
| 4,130,874 | 12/1978 | Pai | 364/514 |
| 4,215,394 | 7/1980 | Galloway et al. | 363/137 |

OTHER PUBLICATIONS

James H. Galloway, "Pulse Coded Inverter for Utility Load Management System", IAS '77 Annual, pp. 149–155.
Richard J. St. Onge et al., "One Year Operating Experience of a Pulse Coded Inverter for Utility Load Management Systems", pp. 1–7.

*Primary Examiner*—William M. Shoop
*Assistant Examiner*—Peter S. Wong
*Attorney, Agent, or Firm*—Saidman & Sterne

[57] ABSTRACT

An inverter controller for controlling a three-phase inverter used for generation and subsequent injection of pulse code signals on power lines in a utility load management system is disclosed. The controller includes read-only-memory devices (208, 210) for generating address bus information, read-only-memory devices (212, 214, 216) for generating gate control signals for inverter main valve SCRs, and read-only-memory devices (236, 238) for generating timing sequence control signals. The controller is responsive to microprocessor initiated control signals and features a state machine design.

25 Claims, 8 Drawing Figures

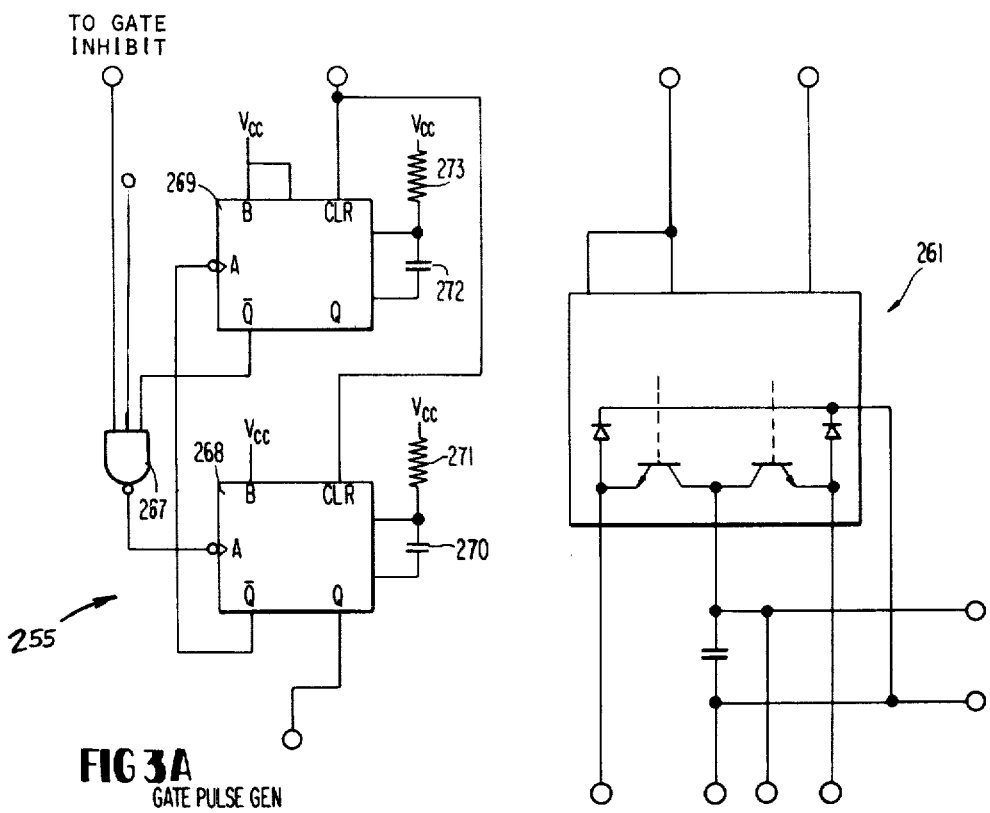
FIG 3A GATE PULSE GEN
FIG 3B GATE AMPLIFIER
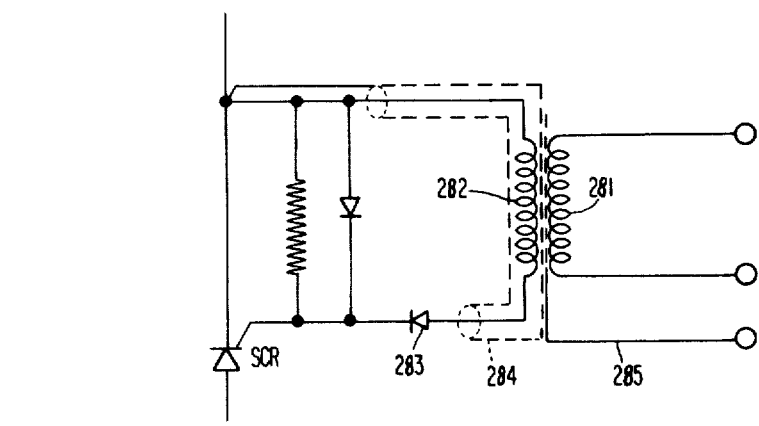
FIG 3C ISOLATION TRANSFORMER

INVERTER CONTROLLER

BACKGROUND OF THE INVENTION

1. Field of the Invention

The present invention relates to an inverter controller for controlling a McMurray inverter which is used for injection of pulse code signals on power lines for load distribution control.

2. Description of the Prior Art

In U.S. Pat. No. 4,215,394 entitled "Control Logic For Inverter Ripple Controlled Power System", which is assigned to Oxy-Metal Industries Corporation of Warren, Michigan, and in which an inventor is Alby M. Berman, there is described an inverter controller which is used to control an McMurray inverter for power line ripple tone injection in an electric load utility management system. In the patent, the invention controller is essentially an analog device. Analog techniques are used for conducting the back feed current through a portion of the inverter, for sequentially connecting and disconnecting the SCR gates, and for timing of the inverter. This analog type of inverter controller is subject to variations in tolerance and in design factors which lead to uncertainties in operation and in performance reliability. The known inverter controller of the Berman patent is not compatible with load management systems which utilize digital microprocessor control techniques for injection of the ripple tone.

OBJECTS OF THE INVENTION

It is one object of the present invention to provide a state machine for controlling a McMurray inverter for the purpose of generating pulse code signals for utility load management systems. A state machine is a device which has a plurality of states, all of which are predictable and from which the next states are also predictable. The state machine has predetermined states, and there are no magnitude adjustments of the type which are encountered in analog equipment.

Another object of the present invention is to provide a new and improved inverter controller that is compatible with digital microprocessor control techniques.

A further object of the present invention is to provide an inverter controller wherein the controller permits external microprocessor-based digital logic control of its mode of operation.

An additional object of the present invention is to provide for precise timing and control of the injection of pulse code signals on utility load lines.

It is yet another object of this invention to provide an inverter controller which is timed in one microsecond steps in order to provide precise and accurate control of all inverter controller functions and gate switching commands which are received by a power class three-phase inverter.

SUMMARY OF THE INVENTION

The inverter controller of the present invention is utilized for controlling the firing and timing sequences of gated conduction controlled rectifiers in an inverter used for generting a pulse code signal for injection upon electrical transmission lines. The inverter controller utilizes an address bus for providing address information to various memories. Further, there is provided means responsive to functional commands from a microprocessor which indicate the desired mode of operation of the inverter and which provides a portion of the address information on the address bus. A first memory means is responsive to the address bus information and generates next address information for the controller. There is a first register means for receiving the next address information from the first memory means and for delivering the other portion of the address information to the address bus. There is a second memory means responsive to the address information on the address bus for generating next inverter SCR gate control signals. There is also a second register means for receiving the next gate control signals from the second memory means and which provides the signals for the gate controlled rectifiers of a McMurray inverter.

This invention also provides for the generation of precise timing signals which are controlled by a first clock which is six times the frequency (6fo) of the pulse code output, and by a second clock which is a one microsecond pulse received from the microprocessor. The generation of timing sequence signals for this invention is accomplished by the use of a counter which generates addresses for timing sequence ROMs. The outputs from the timing sequence ROMs are clocked through timing registers in accordance with the one microsecond clock to provide the required timing sequence signals to the registers which transmit SCR firing information and address information.

BRIEF DESCRIPTION OF THE DRAWINGS

FIG. 3A shows the oscillator and inhibit NAND gate for each main SCR gate control.

FIG. 3B shows a transistor amplifier used to drive the gates.

FIG. 3C shows a gate transformer which is used on the gates of the main SCR and commutate SCRs of the inverter.

DETAILED DESCRIPTION OF THE PREFERRED EMBODIMENT

The inverter controller of the present invention interfaces commands from a microprocessor to turn on and off the solid state conduction controlled rectifying devices (for example, SCRs) of a power class three-phase DC-AC inverter, such as a McMurray inverter, to generate audio frequency pulse code signals for injection onto power lines of an electric utility. The pulse code signal generated by the inverter is decoded by remote receiver units positioned at and connected to control the customer loads to implement a desired load management strategy. The inverter controller of the present invention, along with the inverter and microprocessor controller, is part of a substation injection unit positioned at the utility's substation which communicates with a central computer terminal or master control station via voice grade telephone lines.

Figure 1:
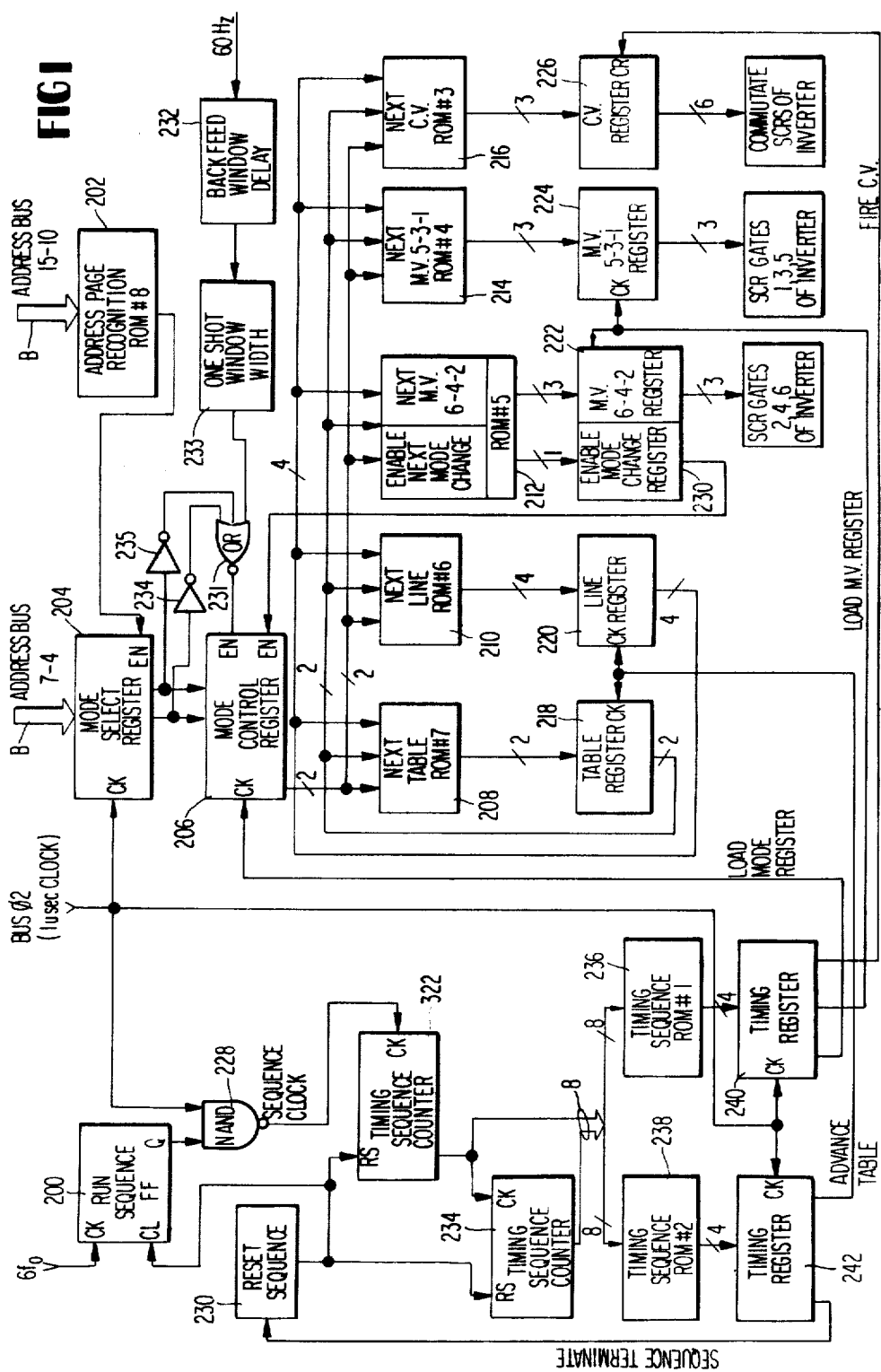
FIG. 1 shows in block diagram form the timing control, memories and registers which provide a state machine control for the inverter.

Referring to FIG. 1, information pertaining to the desired mode of operation of the inverter is received from the substation injection unit microprocessor along an address bus B by an address page recognition ROM 202 and a mode select register 204. The mode select register 204 provides a two bit output which represents one of the four possible modes of operation of the inverter. The four modes of operation are CRASH (output 00), OFF (output 01), IDLE (output 10), and INJECT (output 11). In the CRASH mode, the inverter SCRs are shut down in response to detection of a fault condition. In OFF, the SCRs are all turned off momentarily. The IDLE mode corresponds to the absence of a pulse in the pulse code signal that forms the injection message, while the INJECT mode corresponds to the presence of a pulse in the pulse code signal.

The initial timing of the inverter controller output signals is achieved through a mode control register 206. The mode control register 206 is clocked by a timing signal referred to as the load mode register signal received from a timing register 240, and is enabled by signals from an enable mode change register 230, to be explained more fully below. A second enabling input is applied to mode control register 206 from an OR gate 231 which is responsive to a back feed 60 Hertz signal obtained either from the power lines or from the rectifier controller of the substation injection unit, as will be explained in greater detail hereinafter.

Upon receipt of the two enabling inputs and the load mode register signal, mode control register 206 receives the two bit code from the mode select register 204 and delivers same to its two line output which forms a portion of an address for an eight bit address bus that feeds a plurality of read-only-memories (ROMs) 208, 210, 212, 214 and 216.

ROMs 208 through 216 can be denoted as a next table ROM 208, a next line ROM 210, enable next mode change and the next main SCR ROMs 212 and 214 and a next commutate SCR ROM 216.

Associated respectively with each of the ROMs 208 through 216 are output registers 218, 220, 222, 224 and 226 which can be denoted as a table register 218, a line register 220, main SCR registers 222 and 224 and commutate SCR register 226. An enable mode change register 230 is also connected to receive an output from ROM 212.

The addresses for next table ROM 208, next line ROM 210, enable next mode change and next main SCR ROM 212, next main SCR ROM 214 and next commutate SCR ROM 216 are generated in response to the initial two bit address from the mode control register 206, and further in response to timing signals received from timing registers 240 and 242. The address bus for providing information to the ROMs 208 through 216 includes eight bits of address. Two of the eight address bits are supplied by the mode control register 206. The remaining six bits are generated by next table and next line ROMs 208 and 210. The registers 218 and 220 receive the information from ROMs 208 and 210 when they are clocked by advance table signals which are generated by timing register 242. The information in next table ROM 208 is the next table information and comprises two of the address bits which are applied to all of the ROMs 208, 210, 212, 214 and 216. The ROM 210 contains the next line address information in the form of the remaining four bits for the address bus.

The eight bit address to ROMs 208, 210, 212, 214 and 216 consists of the information on two lines from the mode control register 206, the information on two lines from table register 218, and the information on four lines which come from the line register 220. The address on the address bus is changed when a first timing signal, the advance table signal, is received from timing register 242. The advance table signal is applied to the clock terminals of table register 218 and line register 220. When these registers are clocked, the next table information from ROM 208 and the next line information from ROM 210 will be latched in and set as the table and line information for six of the eight bits of the address bus. As the address bus information changes, the output of next table ROM 208 and next line ROM 210 will advance to the next address of the ROMs which contains information at the location addressed by the address bus pertaining to the next desired address. In this manner, whenever the clock terminals of the table register 218 and the line register 220 are clocked, the address on the eight bit address bus will change to the next desired address. It is through the continuous clocking of the table register 218 and the line register 220 that the address information for ROMs 208, 210, 212, 214 and 216 is continuously changed for cycling the firing control information for the inverter SCRs.

The ROMs 212, 214 and 216 with their associated output registers 222, 224 and 226 operate in a similar manner. The information appearing on the outputs of ROMs 212, 214 and 216 is the next-to-be-used firing information for the main valves and commutate valves of the inverter.

When the next main SCR ROM 212 is addressed, there appears on its output bus three bits for indicating the next desired firing state of inverter SCRs 6, 4 and 2. Similarly, when the next main SCR ROM 214 is addressed, it produces on its output three bits for indicating the next desired firing state for inverter SCRs 5, 3 and 1.

The main SCR register 222 receives the three bits of information from next main SCR ROM 212 when a timing signal is received on the load main SCR register line which is generated by timing register 240. Similarly, the main SCR register 224 which controls SCRs 5, 3 and 1 is also clocked by the load main SCR register timing signal from controller timing register 240.

All of the commutate SCR firing controls are generated by next commutate SCR ROM 216 which also responds to the address bus information. Next commutate SCR ROM 216 has as outputs three bits which are received by commutate SCR register 226. The commutate SCR register 226 preferably comprises a 3 by 8 decoder for decoding the three bit output from next commutate SCR ROM 216 to create six commutate SCR firing signals (only six of the eight output bits are used). The commutate SCR register 226 has as a clock input the fire commutate SCR timing signal which is received from timing register 240.

In order to clock the mode control register 206, the table register 218, the line register 220, the main SCR register 222, the main SCR register 224, and the commutate SCR register 226, it is necessary to generate timing signals which are appropriately spaced in time to control the desired sequence of events. The timing of the events determines the output frequency of the inverter.

The apparatus for generating the necessary timing signals is also shown in FIG. 1. A 6fo signal (where fo = the desired pulse code frequency) is applied to the clock input of a run sequence flip-flop 200. The run sequence flip-flop 200 is triggered on the positive zero-crossing of the 6fo signal and produces an output to a sequence clock in the form of a NAND gate 228. The other input to NAND gate 228 is a one microsecond clock pulse. The output of NAND gate 228 is a sequence clock signal which is a burst of one microsecond clock pulses for a period of time determined by the run sequence flip-flop 200. The output of NAND gate 228 is fed to a timing sequence counter 232 at its clock terminal. The timing sequence counter 232 and a companion timing sequence counter 234 count the one microsecond clock pulses within the run sequence which are received from NAND gate 228. The output of timing sequence counters 232 and 234 is an eight bit address code which is used to address a timing sequence ROM 236 and a timing sequence ROM 238.

As signals are generated by the timing sequence counters 232 and 234, the data in the memory addresses of the timing sequence ROMs 236 and 238 are read out, one address each microsecond. The address code from the timing sequence counters 232 and 234 changes upon each clock input received from the NAND gate or sequence clock 228.

The data outputs from the timing sequence ROMs 236 and 238 are fed respectively to timing registers 240 and 242. There are four bits of data fed from timing sequence ROM 236 to timing register 240 and four bits from timing sequence ROM 238 to timing register 242. The clock signal from timing registers 240 and 242 comprises the one microsecond clock input. The outputs of the timing registers 240 and 242 are precisely timed pulses in accordance with the one microsecond clock, and in accordance with the timing sequence ROM address chosen by the timing sequence counters 232 and 234.

One output from the timing register 242 is comprises a sequence terminate signal. The sequence terminate signal is applied to a reset sequence circuit 230 which preferably comprises a one-shot flip-flop. The output of the one-shot 230 is then applied to reset the timing sequence counters 232 and 234, and also to clear the run sequence flip-flop 200. The application of this pulse to the run sequence flip-flop 200 terminates the sequence until the next positive going 6fo signal is observed.

Figure 4:
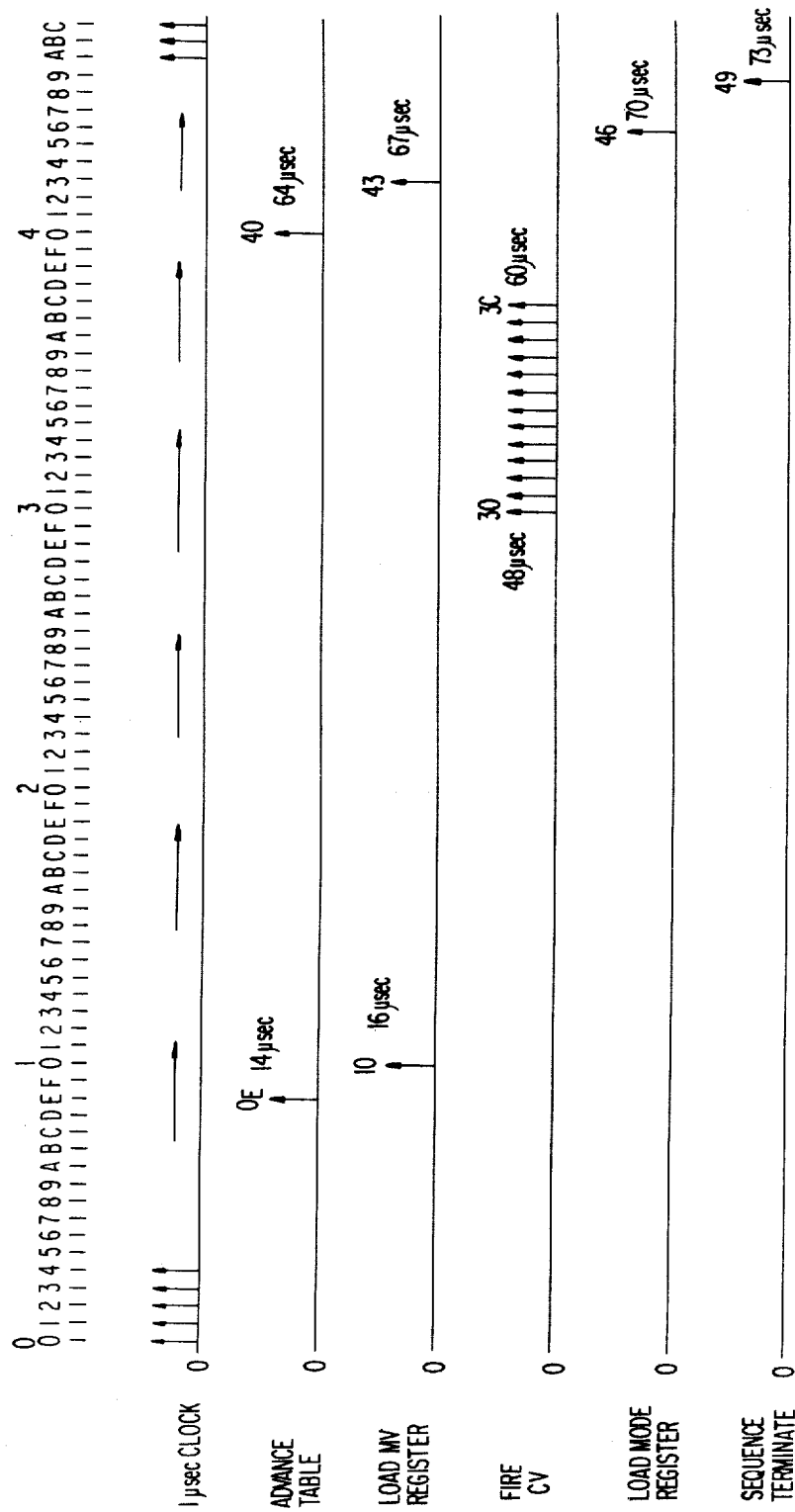
FIG. 4 shows the timing and sequence signals and timing and sequence memory locations.

In FIG. 4, there is shown a timing diagram which shows the one microsecond inputs and the various outputs of timing registers 240 and 242. The numbers appearing along the top are written in the hexadecimal numbering system and correspond to the memory locations in timing sequence ROMs 236 and 238, and the numbers written just above each timing pulse in the timing lines below indicate the corresponding hexadecimal numbers or locations in ROMs 236 and 238 where data exists to output the timing pulses at the desired times. To the side of each pulse, there is also indicated the time measured from zero when the pulse occurs. The line labeled one microsecond clock shows the one microsecond clock signals on one input to the sequence clock or NAND gate 228. When a 6fo positive going signal is received by the run sequence flip-flop 200, the other terminal of NAND gate 228 goes high and the sequence clock 228 emits a burst of one microsecond sequence pulses until the timing sequence is terminated. The last line in FIG. 4 shows that the sequence terminate signal is stored at memory location 49, or at the time of the 73rd microsecond clock pulse.

The five timing signals from the timing registers 240 and 242 are denoted the load mode register signal, the load main SCRs register signal, the advance table signal, the fire commutate SCRs signal, and the sequence terminate signal, and are all controlled by the information loaded in the timing sequence ROMs 236 and 238. Only five of the eight potential output lines from ROMs 236 and 238 contain information which is used in the run sequence. These five lines are used to advance the table and line, load the main SCR registers, fire the commutator SCRs, load the mode register, and to terminate the sequence.

As can be seen in FIG. 4, at ROM memory location 00 the output of all five timing lines in zero. The output of all five timing lines remains zero until address OE which is addressed at 14 microseconds. At this address, a "1" will appear on the advance table line and an "0" will remain on the rest of the output lines. Similarly, at ROM address 10, which is addressed at 16 microseconds, a "1" will appear on the load main SCR registers line and the rest of the lines will remain "0". The next information from the ROMs 236 and 238 are the fire commutate SCRs signals and "1"s will be delivered from address 30 and will continue until address 3C. The next "1" output will appear on the advance table line from ROM address 40. Similarly, the next "1" output will appear from ROM address 43 which occurs at 67 microseconds and which appears on the load main SCR register line. The next ROM address which produces a "1" output is ROM address 46 which delivers a "1" on the load mode register line. The last ROM address used terminates the sequence, and this appears on the squence terminate line when ROM address 49 is read out.

The termination of the sequence at 73 microseconds is a relatively short period of time when compared to the time required for completion of one 6fo cycle. In the preferred embodiment, the pulse code output frequency fo is 340 Hertz. Therefore, the 6fo frequency is 2,040 Hertz. The time for one 6fo cycle is therefore approximately 490 microseconds. It therefore can be seen that the complete timing sequence occurs during the initial 73 microsecond portion of each 6fo signal. The outputs on the various timing lines to the inverter controller registers do not change until the next 6fo cycle is initiated over 400 microseconds later.

The load mode register timing signal is generated by timing register 240, and is applied to the mode control register 206 as the last pulse of the series of timing sequence pulses which control the cycling of the inverter controller. It is through this pulse that a new address is applied to ROMs 208 through 216 in response to a mode change address received by the mode select register 204. The load mode register clock pulse is the final timing pulse of the timing sequence. Therefore, a change in the information in the mode control register 206 will not effect the firing of the SCRs of the inverter until the next 6fo interval begins, and the next advance table timing signal is output from address OE in timing sequence ROM 238 at 14 microseconds.

The enable mode change register 230 is responsive to the enable next mode change portion of the next main SCR ROM 212. The enable next mode change output is a one bit output which occurs at the end of each 6fo interval. The enable mode change register 230 is responsive to the load main SCR register timing signal from timing register 240 as is the main SCR register portion of register 222. The output of the enable mode change register 230 is then fed to the mode control register 206 to enable the mode control register at the end of each 6fo interval, or at the end of each 340 Hertz signal.

At the beginning of the INJECT mode, it is necessary to inject the pulse code signal at the proper point in the 60 Hertz voltage of the substation bus to prevent injection transformer saturation. This point is determined experimentally and is set by adjustment of the back feed window delay circuit 232.

The second enabling input for the mode control register 206 is received from the back feed window delay circuit 232 which receives the 60 Hertz signal representative of the line voltage. A back feed window delay circuit 232 and a one-shot window width circuit 233 provide one of the three inputs to an OR gate 231.

The two bit output from mode select register 204 is connected to inverters 234 and 235 so that the output of inverters 234 and 235 is a logical "0" when the mode select register outputs a signal representing the INJECT mode, which is a "11" input to the inverters 234 and 235. The OR gate 231 acts as a disabling gate for the mode control register 206. When the input to the OR gate 231 is "0" on all three lines, the output of the OR gate 231 will be a logical "1", which disables the mode control register 206. At all other times, when a "1" appears on any one of the three input lines to OR gate 231, the output of OR gate 231 will enable the mode control register 206. In this manner, the only possible time that the mode control register is disabled is during the INJECT mode when the output of inverters 234 and 235 are logical "0"s.

The back feed window delay circuit 232 has as an input a point on the 60 Hertz three-phase lines. The back feed window delay 232 is merely a one-shot with an adjustable time constant which will delay its output a predetermined period of time which is selectable in accordance with equipment operation. The back feed window delay may be on the order of, for example, one to five milliseconds. The delayed output from the back feed window delay 232 is then fed to a one-shot flip-flop 233 which has a predetermined width or time which is slightly greater than the time required for one 340 Hertz cycle. This time may be set to, for example, four milliseconds. The output of the one-shot 233 will be a logical "0" until the window from circuit 232 is seen. When the window is present, the one-shot 233 output will be a logical "1" which will allow the mode control register 206 to be enabled. When the output of the one-shot 233 is a "0" during INJECT, the mode control register 206 will be disabled by virtue of the fact that there are three "0" on the inputs to OR gate 231.

The width of the window or the time period of four milliseconds for the one-shot 233 must be greater than the time interval between one enable mode change command from register 230 and the next. Since the enable mode change commands from register 230 occur only once in each 340 Hertz cycle, then the time period for the one-shot 233 must be slightly greater than the time for one 340 Hertz cycle.

Outputs of main SCR registers 222 and 224 are each connected to a gate pulse generator 255 as illustrated in FIG. 3A. The gate pulse generators may each comprise, for example, 50 kilohertz oscillators which are controlled by the output from the main SCR registers 222 and 224. FIG. 3A shows a preferred embodiment of a single gate pulse generator. This gate pulse generator 255 consists of two one-shot pulse generators 268 and 269 and a NAND gate 267 which receives as one input thereto an the output from one of the main SCR registers 222 or 224. The NAND gate 267 also has as a third input thereto a connection from a window circuit located in the inverter bridge, to be described later. NAND gate 267 provides an input to one-shot 268 which fires for a time determined by capacitor 270 and resistor 271. The output of one-shot 268 is then fed to one-shot 269 which then fires and remains on for a period determined by capacitor 272 and resistor 273. When one-shot 269 returns to its normal state, the output of NAND gate 267 again goes high, and one-shot 268 is again triggered, thereby producing the oscillation required at its Q output. The values of capacitor 270, resistor 271, capacitor 272, and resistor 273 are chosen so that the frequency of the oscillator will be approximately 50 kilohertz.

The output of the gate pulse generator of FIG. 3A is then applied to a gate amplifier or integrated circuit driver 261 as illustrated in FIG. 3B. The gate amplifiers for each SCR, which is driven by the main SCR registers 222 and 224, are identical. The outputs of the transistor amplifiers 261 are then applied to the inputs of the various inverter SCRs through isolation transformers.

Figure 2:
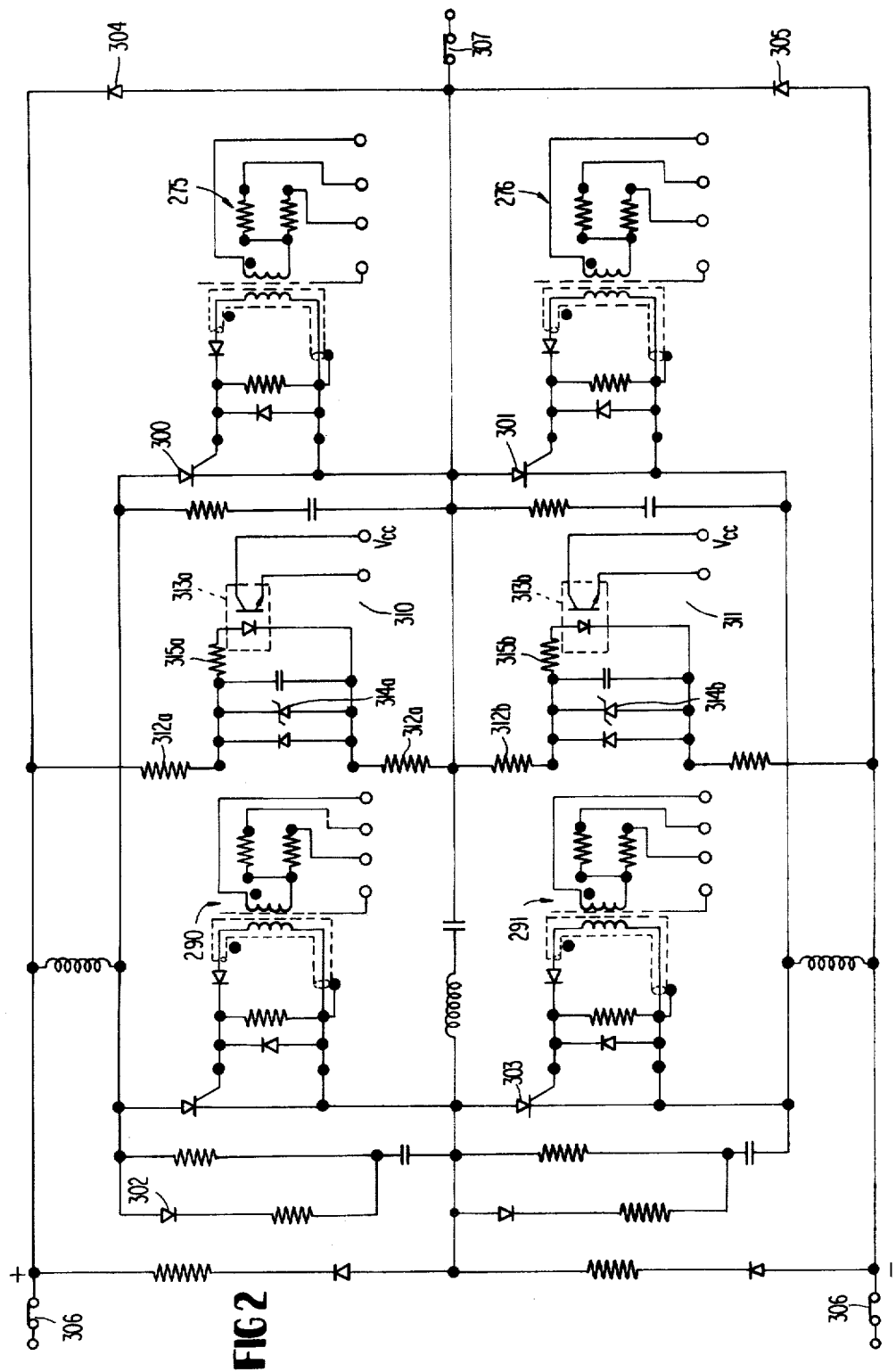
FIG. 2 shows a McMurray inverter for one phase of the AC output.

The isolation transformers are identified by reference numerals 275 and 276 of FIG. 2. A preferred embodiment of an isolation transformer for the SCR gates is depicted in FIG. 3C and has the outputs from a gate amplifier applied to the transformer winding 281 to develop a gate output signal on transformer winding 282. A diode 283 is connected in series with the secondary of the transformer 282 to provide rectification of the 50 kilohertz signal which is necessary for proper control of the SCR gate. The isolation transformer also includes a coaxial shield 254 on the secondary and a Faraday shield 285 to prevent triggering of the SCR by noise that can be capacitively fed through the transformer.

The commutate SCR register 226 has as an input one microsecond timing signals which are generated when the fire commutate SCR signal from timing register 240 clocks commutate SCR register 226. Since the output from register 226 output is at a high frequency, it is not necessary to utilize a 50 kilohertz oscillator as was used in the driving circuitry for the main SCR controls. Therefore, the outputs of commutate SCR register 226 are fed directly to transistor amplifiers of the type shown in FIG. 3B. The outputs of these transistor amplifiers are then fed to the commutate SCR isolation transformers 290 and 291 (FIG. 2). The isolation transformers 290 and 291 are identical to isolation transformer 275 which is illustrated on FIG. 3C.

In FIG. 2, there is shown an inverter circuit which is used for one of the three-phase outputs of the inverter. The other two phase outputs are handled by substantially identical circuits which therefore need not be described. The inverter circuit shown is of the type known as a McMurray inverter. This inverter utilizes main SCRs 300 and 301, and commutate SCRs 302 and 303. The power input to the inverter is on the DC bus 306 and the single phase output voltage is on line 307.

The diodes 304 and 305 are connected across SCRs 300 and 301 respectively. The diodes 304 and 305 cooperate to handle load currents when the phase angle of the load is other than zero.

In FIG. 2, there are shown two gate inhibit circuits 310 and 311. The gate inhibit circuit 310 senses the voltage across diode 304, and the gate inhibit circuit 311 senses the voltage across diode 305. The gate inhibit circuits include resistors 312a and 312b which limit the current to the voltage sensing device. The inhibit circuits 310 and 311 also include opto-isolators 313a and 313b. The voltage across the opto-isolator diodes is limited to, for example, 5 volts by Zener diodes 314a and 314b. The resistors 315a and 315b further limit the current applied to the opto-isolators 313a and 313b which are respectively connected to NAND gates in the gate pulse generators associated with each respective gate. The gate pulse generator for SCR 300 is represented in FIG. 3A by reference numeral 255. In FIG. 3A, NAND gate 267 has, as a third input, the output from opto-isolator 313a. Therefore, whenever a "0" appears as the output of opto-isolator 313a, a logical "0" is applied to NAND gate 267, which inhibits the output of NAND gate 267 and stops the gate pulse generator 255, which in turn turns off the signal to the gate of SCR 300. In FIG. 2, if diode 3094 is back biased, the voltage across diode 304 will produce a voltage across Zener diode 314a and hence across the diode of opto-isolator 313a. When this condition occurs, the opto-isolator will produce a logical "1" as its output, and NAND gate 267 will be enabled. In this manner, the circuit is responsive to the voltage across diode 304.

When diode 304 is conducting, it is necesary that the gate control voltage to SCR 300 be inhibited or turned off, since, when diode 304 is conducting, SCR 300 will be reverse biased, and the appearance of any gate voltage during such a reverse bias condition will produce a failure of the SCR 300.

In order to understand the operations which produce conditions wherein the gate inhibit circuit is utilized, during the inject mode, the following analysis of the action of the inverter circuit is required.

When the SCR 301 is conducting, current wil flow through SCR 301 from the phase output 307 to the negative DC bus. When the end of the 6fo interval during which SCR 301 is conducting is reached, the control gate to SCR 301 is first turned off in accordance with the load main SCR register command, which occurs at 16 microseconds and which is produced by the timing register 240 of FIG. 1. When this signal is received, the SCR 301 will have its gate signal removed, but the SCR 301 will continue to conduct current. It is then necessary to commutate the SCR 301 by turning on SCR 303. A fire commutate SCR signal is sent from the timing register 240 to the commutate SCR register 226 (FIG. 1). This produces commutate signals for SCR 303 commencing at 48 microseconds and continuing to 60 microseconds (See FIG. 4). During this time interval, SCR 303 will be turned on, and the current will be removed from SCR 301 thereby allowing SCR 301 to turn off.

During commutation, the load current will be carried by commutate SCR 303, but this condition is undesirable for a long period of time.

The next step is therefore the advancing of the table in accordance with timing register 242 which clocks table register 218 and line register 220 to change the address on next main SCR ROMs 22 and 214. When this occurs, the next SCR command will appear on the inputs to main SCR registers 222 and 224. When the load main SCR register timing signal is sent at 67 microseconds from timing register 240, the SCR firing information will change and a signal to turn on the gae of SCR 300 will begin.

Even though there is a command from the main SCR register 222 or 224 to turn on the SCR 300, the SCR 300 should not be turned on because, as described above, there will initially be current flowing through diode 304. The current flow through diode 304 prduces the reverse bias condition on SCR 300 which requires that SCR 300 not receive a gate signal. It is during this condition that the gate inhibit circuits must inhibit any voltage to the gate of SCR 300. This is accomplished by sensing the low voltage across diode 304, which produces a logical "0" output from opto-isolator 313a which inhbiits NAND gate 267 of FIG. 3A.

When there is a command to switch from the conduction of SCR 300 to the conduction of SCR 301, the procedure will be repeated, and the gate inhibit circuit 311 wll protect SCR 301 in the same manner as described above with respect to circuit 310 and SCR 300.

Figure 6:
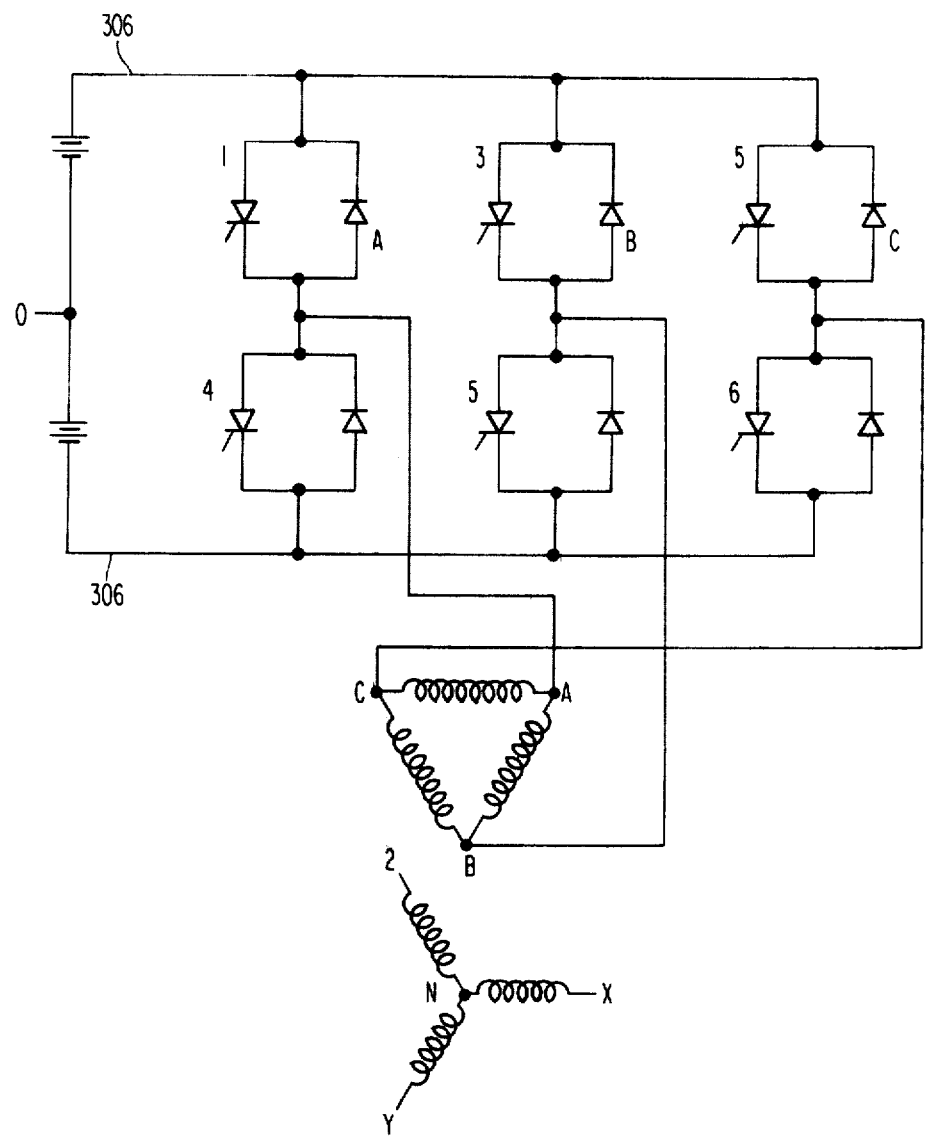
FIG. 6 shows in simplified form the inverter bridge and the injection transformer.

When the inverter is in its IDLE mode, it is necessary to provide a short circuit current path in the primary of the injection transformer 320 connected to the output of the inverter for injecting the 340 Hertz pulse code signals onto the power lines, as shown in FIG. 6. This short circuit path is achieved by turning on the lower SCRs in the inverter bridge (SCRs 6, 4 and 2). Therefore, during IDLE, the output of main SCR register 222 continually turns on the gates of SCRs 6, 4 and 2.

In this manner, there is created a recirculating current in the delta wound primary of the injection transformer 320. The circulation is through the connection of each of the three-phase lines of the delta transformer 320 to one side of the DC bus 306 by turning one set of the SCRs on. However, when the SCRs are turned on, it is also necessary to consider the action of the diode which is paired with each SCR. Such parings comprise SCR 300 with diode 304, and SCR 301 with diode 305 (FIG. 2). The circulating current in the primary of the transformer 320 is an alternating current, and this requires that diodes associated with the on SCR conduct part of the current. The diodes associated with the main SCRs 6, 4 and 2 conduct during IDLE, as shown in FIG. 6.

In the IDLE mode, when SCR 301 is turned on, there must be a means for removing the gate signal from SCR 301 during the time period in which its paired diode 305 conducts. This again is implemented by the gate inhibit circuit 311. As the voltage on diode 305 goes to zero, the output of the inhibit circuit 311 will be a logical "0" which, when fed to the gate pulse generator associated with SCR 301, will turn off its associated NAND gate 267 as shown in FIG. 3A.

Figure 5:
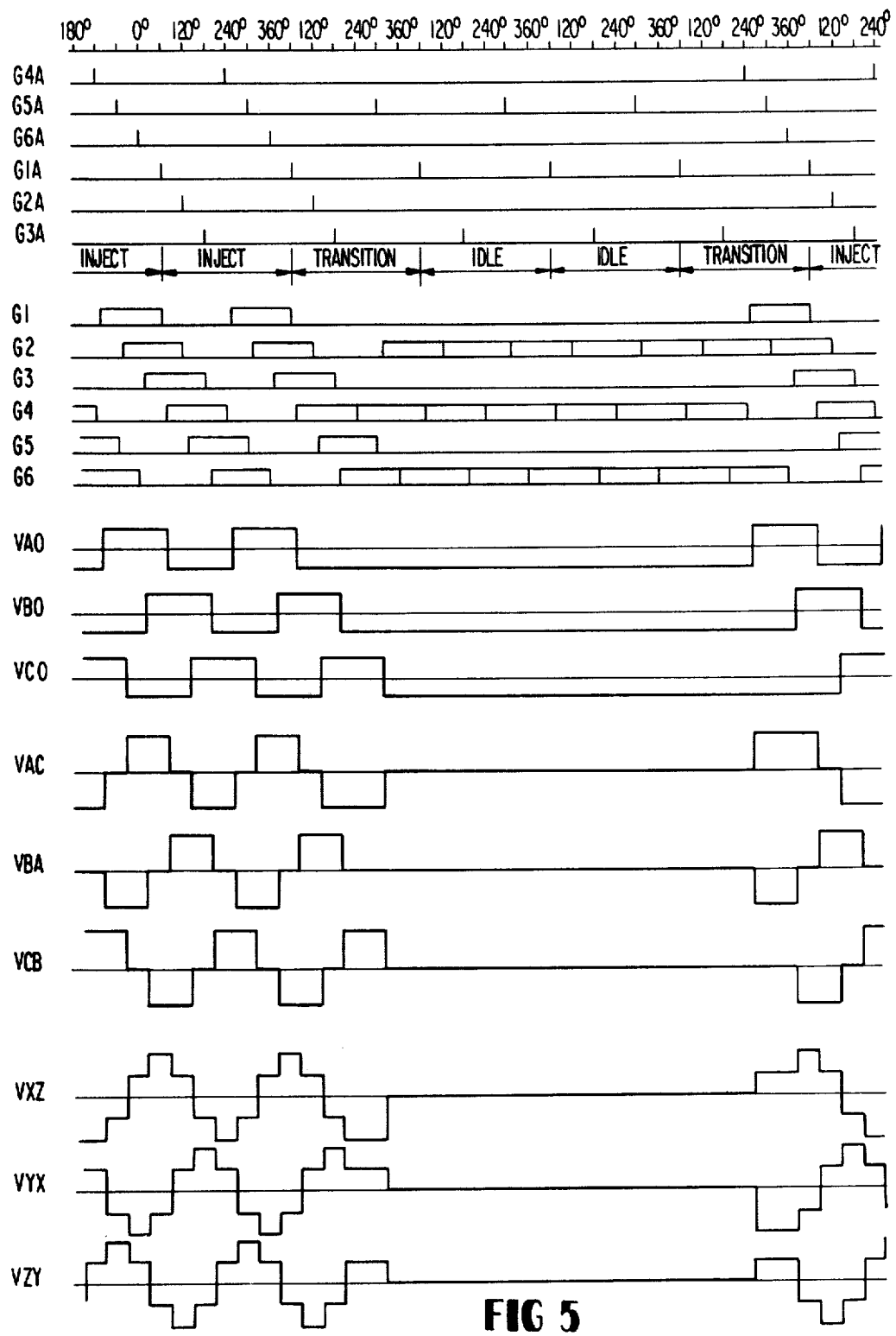
FIG. 5 shows the timing diagrams of the SCR main gates, the SCR commutate gates and the injection transformer input and output voltages.

In FIG. 5, there is shown the timing diagram of the gate SCR signals and the commutate SCR signals. This diagram has been constructed without showing the gate inhibit in both the IDLE and in the INJECT modes in order to more clearly illustrate the timing of the value gates by the controller. The top set of waveforms in FIG. 5 illustrate the commutate SCR signals which are labeled G1A through G6A. The commutate SCR signals are shown as narrow pulses, although there are 12 commutate fire pulses generated by timing register 240 which are fed to the commutate SCR register 226. The time duration of these commutate valve pulses total only 12 microseconds.

The gate SCR signals are shown below the commutate SCR signals and are indicated generally as G1 through G6.

The next set of curves comprises the voltages from the McMurray inverter's three phase outputs to the zero reference of the DC voltage supply. These voltages are from A to 0, B to 0 and C to 0 in FIG. 6. "0" is the center or reference point of the DC supply or bus 306.

Shown next in FIG. 6 are the voltages from line-to-line which are applied to the delta connection of the injection transformer 320 of FIG. 6.

The last set of curves in FIG. 6 are the voltages which appear on the secondary or Y connection of transformer 320 which are injected into the power lines for signaling purposes.

In FIG. 6 is illustrated the layout of the SCRs which correspond to the main SCR designations 6, 4 and 2 and 5, 3 and 1 in main SCR registers 222 and 224 from FIG. 1. The SCRs in FIG. 6 are numbered in accordance with their firing order.

As can be seen by examining the gate SCR voltage signals G1 through G6 in FIG. 5; one SCR turns off and another turns on at each switching time. When it is desired to fire SCR 1, it is first necessary to turn off SCR gate 4, commutate SCR 4, and then turn on SCR gate 1. This timing sequence for turning off and turning on is controlled by the firing control signals which are set forth in FIG. 4. The sequence starts first with the advance table command at 14 microseconds. This command sets the next main SCR information at the input of main SCR registers 222 and 224. When the load main SCR register pulse is received at 16 microseconds, the on gate signal to SCR 4 will be removed. At 48 microseconds, the commutate pulses will begin. The cummutate pulse is shown as G4A, the first line of FIG. 5. When the commutate pulse is terminated, SCR 4 will be turned off and the diode associated with SCR 1 will conduct. At this point, it is necessary to turn on SCR 1 in order to complete the switching cycle. SCR 1 is turned on by first advancing the table to the next SCR command, and this command occurs at 64 microseconds, again as shown on FIG. 4. Secondly, it is necessary to change the main SCR firing information in register 224 in order to turn main SCR 1 on. This is accomplished when the load main SCR register signal at 67 microseconds which is received by the main SCR register 224. At this point, the turning off of SCR 4 and the turning on of SCR 1 has been accomplished.

The firing information which produces the desired main SCR and commutating SCR firing orders during the various modes is loaded into appropriate addresses in ROMs 208 through 216. The maps for these ROMs which implement the above-described sequencing are appended hereto as Appendices 1 through 5 which respectively correspond to ROMS 208, 210, 212, 214 and 216.

Referring again to FIG. 5, the voltage A0 line indicates the voltage from point A of FIG. 6 to 0, the neutral of the DC bus. The voltage A0 is applied to point A of the delta connection of transformer 320 of FIG. 6 Similarly, the voltages B0 and C0 are applied to the other terminals B and C of the delta connected transformer 320. The voltages AC, BA and CB are the voltages from point A to point C, point B to point A and point C to point B, respectively, across the windings of transformer 320. By adding the voltages A0 and B0, the voltage BA is obtained. Next, the voltages VXZ, VYX and VZY are shown at the bottom of FIG. 5. These voltages represent the waveforms as they would appear on the output of transformer 320 absent any inductance. However, the secondary of the transformer is connected to the utility power system which is highly inductive. Therefore, these output voltages are substantially smooth, and appear sinusoidal with little harmonic distortion.

Obviously, numerous modifications and variations of the present invention are possible in light of the above teachings. It is therefore to be understood that within the scope of appended claims the invention may be practiced otherwise than as specifically described herein.

APPENDIX 1

ROM 3

| ADD. | DATA | ADD. | DATA | ADD. | DATA | ADD. | DATA | ADD. | DATA | ADD. | DATA | ADD. | DATA | ADD. | DATA |
|------|------|------|------|------|------|------|------|------|------|------|------|------|------|------|------|
| 00 | 0 | 20 | | 40 | 0 | 60 | 3 | 80 | | A0 | 1 | C0 | | E0 | 3 |
| 01 | | 21 | | 41 | | 61 | 0 | 81 | | A1 | 0 | C1 | | E1 | 0 |
| 02 | | 22 | | 42 | | 62 | 4 | 82 | | A2 | 0 | C2 | | E2 | 4 |
| 03 | | 23 | | 43 | | 63 | 0 | 83 | | A3 | 0 | C3 | | E3 | 0 |
| 04 | | 24 | | 44 | | 64 | 0 | 84 | | A4 | 3 | C4 | | E4 | 5 |
| 05 | | 25 | | 45 | | 65 | 0 | 85 | | A5 | 0 | C5 | | E5 | 0 |
| 06 | | 26 | | 46 | | 66 | 6 | 86 | | A6 | 0 | C6 | | E6 | 6 |
| 07 | | 27 | | 47 | | 67 | 0 | 87 | | A7 | 0 | C7 | | E7 | 0 |
| 08 | | 28 | | 48 | | 68 | | 88 | | A8 | 5 | C8 | | E8 | |
| 09 | | 29 | | 49 | | 69 | | 89 | | A9 | 0 | C9 | | E9 | |
| 0A | | 2A | | 4A | | 6A | | 8A | | AA | 0 | CA | | EA | |
| 0B | | 2B | | 4B | | 6B | 0 | 8B | | AB | 0 | CB | | EB | 0 |
| 0C | | 2C | | 4C | | 6C | 1 | 8C | | AC | | CC | | EC | 1 |
| 0D | | 2D | | 4D | | 6D | 0 | 8D | | AD | | CD | | ED | 0 |
| 0E | | 2E | | 4E | | 6E | 2 | 8E | | AE | | CE | | EE | 0 |
| 0F | | 2F | | 4F | | 6F | 0 | 8F | | AF | | CF | | EF | 0 |
| 10 | | 30 | | 50 | 0 | 70 | | 90 | | B0 | 3 | D0 | | F0 | 1 |
| 11 | | 31 | | 51 | 0 | 71 | | 91 | 0 | B1 | 0 | D1 | | F1 | 0 |
| 12 | | 32 | | 52 | | 72 | | 92 | 1 | B2 | 0 | D2 | | F2 | 2 |
| 13 | | 33 | | 53 | | 73 | | 93 | 0 | B3 | 0 | D3 | | F3 | 0 |
| 14 | | 34 | | 54 | | 74 | | 94 | 0 | B4 | 5 | D4 | | F4 | 3 |
| 15 | | 35 | | 55 | | 75 | | 95 | 0 | B5 | 0 | D5 | | F5 | 0 |
| 16 | | 36 | | 56 | | 76 | | 96 | 3 | B6 | 0 | D6 | | F6 | 4 |
| 17 | | 37 | | 57 | | 77 | | 97 | 0 | B7 | 0 | D7 | | F7 | 0 |
| 18 | | 38 | | 58 | | 78 | | 98 | 0 | B8 | | D8 | | F8 | 5 |
| 19 | | 39 | | 59 | | 79 | | 99 | 0 | B9 | | D9 | | F9 | 0 |
| 1A | | 3A | | 5A | | 7A | | 9A | 5 | BA | | DA | | FA | 6 |
| 1B | | 3B | | 5B | | 7B | | 9B | 0 | BB | 0 | DB | | FB | 0 |
| 1C | | 3C | | 5C | | 7C | | 9C | 0 | BC | 1 | DC | | FC | |
| 1D | | 3D | | 5D | | 7D | | 9D | 0 | BD | 0 | DD | | FD | |
| 1E | | 3E | | 5E | | 7E | | 9E | | BE | 2 | DE | | FE | |

APPENDIX 1-continued

ROM 3

| ADD. | DATA | ADD. | DATA | ADD. | DATA | ADD. | DATA | ADD. | DATA | ADD. | DATA | ADD. | DATA | ADD. | DATA |
|---|---|---|---|---|---|---|---|---|---|---|---|---|---|---|---|
| 1F | | 3F | | 5F | | 7F | | 9F | | BF | 0 | DF | | FF | |

APPENDIX 2

ROM 4

| ADD. | DATA | ADD. | DATA | ADD. | DATA | ADD. | DATA | ADD. | DATA | ADD. | DATA | ADD. | DATA | ADD. | DATA |
|---|---|---|---|---|---|---|---|---|---|---|---|---|---|---|---|
| 00 | 0 | 20 | | 40 | 0 | 60 | 0 | 80 | | A0 | 0 | C0 | | E0 | 0 |
| 01 | | 21 | | 41 | | 61 | 0 | 81 | | A1 | 0 | C1 | | E1 | 0 |
| 02 | | 22 | | 42 | | 62 | 0 | 82 | | A2 | 0 | C2 | | E2 | 0 |
| 03 | | 23 | | 43 | | 63 | 0 | 83 | | A3 | 0 | C3 | | E3 | 1 |
| 04 | | 24 | | 44 | | 64 | 0 | 84 | | A4 | 0 | C4 | | E4 | 1 |
| 05 | | 25 | | 45 | | 65 | 0 | 85 | | A5 | 0 | C5 | | E5 | 1 |
| 06 | | 26 | | 46 | | 66 | 0 | 86 | | A6 | 0 | C6 | | E6 | 1 |
| 07 | | 27 | | 47 | | 67 | 0 | 87 | | A7 | 0 | C7 | | E7 | 3 |
| 08 | | 28 | | 48 | | 68 | | 88 | | A8 | 0 | C8 | | E8 | |
| 09 | | 29 | | 49 | | 69 | | 89 | | A9 | 0 | C9 | | E9 | |
| 0A | | 2A | | 4A | | 6A | | 8A | | AA | 0 | CA | | EA | |
| 0B | | 2B | | 4B | | 6B | 0 | 8B | | AB | 0 | CB | | EB | 0 |
| 0C | | 2C | | 4C | | 6C | 0 | 8C | | AC | | CC | | EC | 0 |
| 0D | | 2D | | 4D | | 6D | 0 | 8D | | AD | | CD | | ED | 0 |
| 0E | | 2E | | 4E | | 6E | 0 | 8E | | AE | | CE | | EE | 0 |
| 0F | | 2F | | 4F | | 6F | 0 | 8F | | AF | | CF | | EF | 0 |
| 10 | | 30 | | 50 | 0 | 70 | | 90 | | B0 | 4 | D0 | | F0 | 2 |
| 11 | | 31 | | 51 | 0 | 71 | | 91 | 0 | B1 | 4 | D1 | | F1 | 2 |
| 12 | | 32 | | 52 | | 72 | | 92 | 0 | B2 | 4 | D2 | | F2 | 2 |
| 13 | | 33 | | 53 | | 73 | | 93 | 0 | B3 | 4 | D3 | | F3 | 6 |
| 14 | | 34 | | 54 | | 74 | | 94 | 0 | B4 | 0 | D4 | | F4 | 5 |
| 15 | | 35 | | 55 | | 75 | | 95 | 0 | B5 | 0 | D5 | | F5 | 4 |
| 16 | | 36 | | 56 | | 76 | | 96 | 0 | B6 | 0 | D6 | | F6 | 4 |
| 17 | | 37 | | 57 | | 77 | | 97 | 0 | B7 | 0 | D7 | | F7 | 5 |
| 18 | | 38 | | 58 | | 78 | | 98 | 0 | B8 | | D8 | | F8 | 1 |
| 19 | | 39 | | 59 | | 79 | | 99 | 0 | B9 | | D9 | | F9 | 1 |
| 1A | | 3A | | 5A | | 7A | | 9A | 0 | BA | | DA | | FA | 1 |
| 1B | | 3B | | 5B | | 7B | | 9B | 0 | BB | 3 | DB | | FB | 3 |
| 1C | | 3C | | 5C | | 7C | | 9C | 0 | BC | 2 | DC | | FC | |
| 1D | | 3D | | 5D | | 7D | | 9D | 0 | BD | 2 | DD | | FD | |
| 1E | | 3E | | 5E | | 7E | | 9E | | BE | 2 | DE | | FE | |
| 1F | | 3F | | 5F | | 7F | | 9F | | BF | 6 | DF | | FF | |

APPENDIX 3

ROM 5

| ADD. | DATA | ADD. | DATA | ADD. | DATA | ADD. | DATA | ADD. | DATA | ADD. | DATA | ADD. | DATA | ADD. | DATA |
|---|---|---|---|---|---|---|---|---|---|---|---|---|---|---|---|
| 00 | 0 | 20 | | 40 | 8 | 60 | E | 80 | | A0 | F | C0 | | E0 | F |
| 01 | | 21 | | 41 | | 61 | E | 81 | | A1 | F | C1 | | E1 | F |
| 02 | | 22 | | 42 | | 62 | C | 82 | | A2 | F | C2 | | E2 | D |
| 03 | | 23 | | 43 | | 63 | C | 83 | | A3 | F | C3 | | E3 | D |
| 04 | | 24 | | 44 | | 64 | C | 84 | | A4 | F | C4 | | E4 | D |
| 05 | | 25 | | 45 | | 65 | C | 85 | | A5 | F | C5 | | E5 | D |
| 06 | | 26 | | 46 | | 66 | 8 | 86 | | A6 | F | C6 | | E6 | 9 |
| 07 | | 27 | | 47 | | 67 | 8 | 87 | | A7 | F | C7 | | E7 | 9 |
| 08 | | 28 | | 48 | | 68 | | 88 | | A8 | F | C8 | | E8 | |
| 09 | | 29 | | 49 | | 69 | | 89 | | A9 | F | C9 | | E9 | |
| 0A | | 2A | | 4A | | 6A | | 8A | | AA | F | CA | | EA | |
| 0B | | 2B | | 4B | | 6B | F | 8B | | AB | 7 | CB | | EB | F |
| 0C | | 2C | | 4C | | 6C | F | 8C | | AC | | CC | | EC | F |
| 0D | | 2D | | 4D | | 6D | F | 8D | | AD | | CD | | ED | F |
| 0E | | 2E | | 4E | | 6E | E | 8E | | AE | | CE | | EE | F |
| 0F | | 2F | | 4F | | 6F | E | 8F | | AF | | CF | | EF | F |
| 10 | | 30 | | 50 | 8 | 70 | | 90 | | B0 | A | D0 | | F0 | 9 |
| 11 | | 31 | | 51 | 0 | 71 | | 91 | 8 | B1 | E | D1 | | F1 | B |
| 12 | | 32 | | 52 | | 72 | | 92 | A | B2 | E | D2 | | F2 | A |
| 13 | | 33 | | 53 | | 73 | | 93 | A | B3 | E | D3 | | F3 | A |
| 14 | | 34 | | 54 | | 74 | | 94 | A | B4 | E | D4 | | F4 | A |
| 15 | | 35 | | 55 | | 75 | | 95 | A | B5 | F | D5 | | F5 | E |
| 16 | | 36 | | 56 | | 76 | | 96 | E | B6 | F | D6 | | F6 | C |
| 17 | | 37 | | 57 | | 77 | | 97 | E | B7 | F | D7 | | F7 | C |
| 18 | | 38 | | 58 | | 78 | | 98 | E | B8 | | D8 | | F8 | C |
| 19 | | 39 | | 59 | | 79 | | 99 | E | B9 | | D9 | | F9 | D |
| 1A | | 3A | | 5A | | 7A | | 9A | F | BA | | DA | | FA | 9 |
| 1B | | 3B | | 5B | | 7B | | 9B | F | BB | 9 | DB | | FB | 1 |
| 1C | | 3C | | 5C | | 7C | | 9C | F | BC | 9 | DC | | FC | |
| 1D | | 3D | | 5D | | 7D | | 9D | F | BD | B | DD | | FD | |

APPENDIX 3-continued

ROM 5

| ADD. | DATA | ADD. | DATA | ADD. | DATA | ADD. | DATA | ADD. | DATA | ADD. | DATA | ADD. | DATA | ADD. | DATA |
|------|------|------|------|------|------|------|------|------|------|------|------|------|------|------|------|
| 1E | | 3E | | 5E | | 7E | | 9E | | BE | A | DE | | FE | |
| 1F | | 3F | | 5F | | 7F | | 9F | | BF | A | DF | | FF | |

APPENDIX 4

ROM 6

| ADD. | DATA | ADD. | DATA | ADD. | DATA | ADD. | DATA | ADD. | DATA | ADD. | DATA | ADD. | DATA | ADD. | DATA |
|------|------|------|------|------|------|------|------|------|------|------|------|------|------|------|------|
| 00 | 0 | 20 | | 40 | 0 | 60 | 1 | 80 | | A0 | 1 | C0 | | E0 | 1 |
| 01 | | 21 | | 41 | | 61 | 2 | 81 | | A1 | 2 | C1 | | E1 | 2 |
| 02 | | 22 | | 42 | | 62 | 3 | 82 | | A2 | 3 | C2 | | E2 | 3 |
| 03 | | 23 | | 43 | | 63 | 4 | 83 | | A3 | 4 | C3 | | E3 | 4 |
| 04 | | 24 | | 44 | | 64 | 5 | 84 | | A4 | 5 | C4 | | E4 | 5 |
| 05 | | 25 | | 45 | | 65 | 6 | 85 | | A5 | 6 | C5 | | E5 | 6 |
| 06 | | 26 | | 46 | | 66 | 7 | 86 | | A6 | 7 | C6 | | E6 | 7 |
| 07 | | 27 | | 47 | | 67 | 0 | 87 | | A7 | 8 | C7 | | E7 | 0 |
| 08 | | 28 | | 48 | | 68 | | 88 | | A8 | 9 | C8 | | E8 | |
| 09 | | 29 | | 49 | | 69 | | 89 | | A9 | A | C9 | | E9 | |
| 0A | | 2A | | 4A | | 6A | | 8A | | AA | B | CA | | EA | |
| 0B | | 2B | | 4B | | 6B | C | 8B | | AB | 0 | CB | | EB | C |
| 0C | | 2C | | 4C | | 6C | D | 8C | | AC | | CC | | EC | D |
| 0D | | 2D | | 4D | | 6D | E | 8D | | AD | | CD | | ED | E |
| 0E | | 2E | | 4E | | 6E | F | 8E | | AE | | CE | | EE | F |
| 0F | | 2F | | 4F | | 6F | 0 | 8F | | AF | | CF | | EF | 0 |
| 10 | | 30 | | 50 | 1 | 70 | | 90 | | B0 | 1 | D0 | | F0 | 1 |
| 11 | | 31 | | 51 | 0 | 71 | | 91 | 2 | B1 | 2 | D1 | | F1 | 2 |
| 12 | | 32 | | 52 | | 72 | | 92 | 3 | B2 | 3 | D2 | | F2 | 3 |
| 13 | | 33 | | 53 | | 73 | | 93 | 4 | B3 | 4 | D3 | | F3 | 4 |
| 14 | | 34 | | 54 | | 74 | | 94 | 5 | B4 | 5 | D4 | | F4 | 5 |
| 15 | | 35 | | 55 | | 75 | | 95 | 6 | B5 | 6 | D5 | | F5 | 6 |
| 16 | | 36 | | 56 | | 76 | | 96 | 7 | B6 | 7 | D6 | | F6 | 7 |
| 17 | | 37 | | 57 | | 77 | | 97 | 8 | B7 | 0 | D7 | | F7 | 8 |
| 18 | | 38 | | 58 | | 78 | | 98 | 9 | B8 | | D8 | | F8 | 9 |
| 19 | | 39 | | 59 | | 79 | | 99 | A | B9 | | D9 | | F9 | A |
| 1A | | 3A | | 5A | | 7A | | 9A | B | BA | | DA | | FA | B |
| 1B | | 3B | | 5B | | 7B | | 9B | C | BB | C | DB | | FB | 0 |
| 1C | | 3C | | 5C | | 7C | | 9C | D | BC | D | DC | | FC | |
| 1D | | 3D | | 5D | | 7D | | 9D | 0 | BD | E | DD | | FD | |
| 1E | | 3E | | 5E | | 7E | | 9E | | BE | F | DE | | FE | |
| 1F | | 3F | | 5F | | 7F | | 9F | | BF | 0 | DF | | FF | |

APPENDIX 5

ROM 7

| ADD. | DATA | ADD. | DATA | ADD. | DATA | ADD. | DATA | ADD. | DATA | ADD. | DATA | ADD. | DATA | ADD. | DATA |
|------|------|------|------|------|------|------|------|------|------|------|------|------|------|------|------|
| 00 | 0 | 20 | | 40 | 4 | 60 | 8 | 80 | | A0 | 8 | C0 | | E0 | 8 |
| 01 | | 21 | | 41 | | 61 | 8 | 81 | | A1 | 8 | C1 | | E1 | 8 |
| 02 | | 22 | | 42 | | 62 | 8 | 82 | | A2 | 8 | C2 | | E2 | 8 |
| 03 | | 23 | | 43 | | 63 | 8 | 83 | | A3 | 8 | C3 | | E3 | 8 |
| 04 | | 24 | | 44 | | 64 | 8 | 84 | | A4 | 8 | C4 | | E4 | 8 |
| 05 | | 25 | | 45 | | 65 | 8 | 85 | | A5 | 8 | C5 | | E5 | 8 |
| 06 | | 26 | | 46 | | 66 | 8 | 86 | | A6 | 8 | C6 | | E6 | 8 |
| 07 | | 27 | | 47 | | 67 | 4 | 87 | | A7 | 8 | C7 | | E7 | C |
| 08 | | 28 | | 48 | | 68 | | 88 | | A8 | 8 | C8 | | E8 | |
| 09 | | 29 | | 49 | | 69 | | 89 | | A9 | 8 | C9 | | E9 | |
| 0A | | 2A | | 4A | | 6A | | 8A | | AA | 8 | CA | | EA | |
| 0B | | 2B | | 4B | | 6B | 8 | 8B | | AB | 8 | CB | | EB | 8 |
| 0C | | 2C | | 4C | | 6C | 8 | 8C | | AC | 8 | CC | | EC | 8 |
| 0D | | 2D | | 4D | | 6D | 8 | 8D | | AD | | CD | | ED | 8 |
| 0E | | 2E | | 4E | | 6E | 8 | 8E | | AE | | CE | | EE | 8 |
| 0F | | 2F | | 4F | | 6F | 8 | 8F | | AF | | CF | | EF | 8 |
| 10 | | 30 | | 50 | 4 | 70 | | 90 | 4 | B0 | C | D0 | | F0 | C |
| 11 | | 31 | | 51 | 4 | 71 | | 91 | 4 | B1 | C | D1 | | F1 | C |
| 12 | | 32 | | 52 | | 72 | | 92 | 4 | B2 | C | D2 | | F2 | C |
| 13 | | 33 | | 53 | | 73 | | 93 | 4 | B3 | C | D3 | | F3 | C |
| 14 | | 34 | | 54 | | 74 | | 94 | 4 | B4 | C | D4 | | F4 | C |
| 15 | | 35 | | 55 | | 75 | | 95 | 4 | B5 | C | D5 | | F5 | C |
| 16 | | 36 | | 56 | | 76 | | 96 | 4 | B6 | C | D6 | | F6 | C |
| 17 | | 37 | | 57 | | 77 | | 97 | 4 | B7 | 8 | D7 | | F7 | C |
| 18 | | 38 | | 58 | | 78 | | 98 | | B8 | | D8 | | F8 | C |
| 19 | | 39 | | 59 | | 79 | | 99 | | B9 | | D9 | | F9 | C |
| 1A | | 3A | | 5A | | 7A | | 9A | 4 | BA | | DA | | FA | C |
| 1B | | 3B | | 5B | | 7B | | 9B | 4 | BB | C | DB | | FB | C |
| 1C | | 3C | | 5C | | 7C | | 9C | 4 | BC | C | DC | | FC | |

APPENDIX 5-continued

ROM 7

| ADD. | DATA | ADD. | DATA | ADD. | DATA | ADD. | DATA | ADD. | DATA | ADD. | DATA | ADD. | DATA | ADD. | DATA |
|------|------|------|------|------|------|------|------|------|------|------|------|------|------|------|------|
| 1D | | 3D | | 5D | | 7D | | 9D | 8 | BD | C | DD | | FD | |
| 1E | | 3E | | 5E | | 7E | | 9E | | BE | C | DE | | FE | |
| 1F | | 3F | | 5F | | 7F | | 9F | | BF | C | DF | | FF | |

What is claimed is:

1. An inverter controller for controlling the firing time and sequence of gated conduction controlled rectifiers in an inverter used for generating a pulse code signal for injection upon electrical transmission lines, which comprises:
   an address bus for providing address information;
   means responsive to functional commands indicative of the desired mode of operation of said inverter for providing a portion of said address information on said address bus;
   first memory means responsive to said address information on said address bus for generating next address information;
   first register means for receiving said next address information from said first memory means and for delivering the other portion of said address information to said address bus;
   second memory means responsive to said address information on said address bus for generating next gate control signals; and
   second register means for receiving said next gate control signals from said second memory means for providing signals for the gate controlled rectifiers of said inverter.

2. An inverter controller as set forth in claim 1, further comprising means for receiving clock signals and for generating a plurality of timing signals, said first and second register means being responsive to certain of said timing signals to enable receipt thereby of said next address information and said next gate control signals respectively from said first and second memory means.

3. An inverter controller as set forth in claim 2, wherein said means responsive to functional commands comprises:
   mode select register means for receiving said functional commands upon receipt thereby of one of said clock signals and for developing a binary mode select signal in response thereto; and
   mode control register means for receiving said mode select signal upon receipt thereby of a first timing signal and an enable mode change signal.

4. An inverter controller as set forth in claim 3, wherein said second memory means is further responsive to said address information for generating said enable mode change signal, said second register means connected to receive said enable mode change signal and to send same to said mode control register means upon receipt of one of a series of second timing signals.

5. An inverter controller as set forth in claim 3, wherein said first memory means comprises read only memory means having information stored in addressable locations therein pertaining to said next address information, said locations addressed by said address information on said address bus, a portion of said address information comprising said binary mode select signal received from said mode control register means.

6. An inverter controller as set forth in claim 5, wherein said read only memory means comprises a next table ROM and a next line ROM each connected to receive said address information on said address bus for respectively providing two and four bits of next address information to said first register means.

7. An inverter controller as set forth in claim 6, wherein said first register means comprises a table register and a line register each enabled by a third timing signal for respectively receiving said two and four bits of next address information from said next table ROM and said next line ROM, the six bits of output signals from said table and line registers comprising said other portion of said address information on said address bus.

8. The inverter controller of claim 7 wherein said means for receiving clock signals and for generating a plurality of timing signals comprises:
   means for receiving a first clock signal which is six times the desired inverter output frequency and for receiving a second clock signal;
   counter means for generating a series of address codes in accordance with said second clock signal;
   memory means having a plurality of addressable locations certain of which contain timing data, said locations addressed by said series of address codes for producing said timing signals each time said certain memory locations are addressed; and
   timing register means connected to said memory means for producing said timing signals as outputs upon receipt of said second clock signal, wherein said timing signal include said first and third timing signals.

9. An inverter controller as set forth in claim 3, wherein said second memory means comprises read only memory means having information stored in addressable locations therein pertaining to the desired firing sequence of said gated conduction controlled rectifiers in said inverter, said locations being addressed by said address information on said address bus.

10. An inverter controller as set forth in claim 9, wherein said rectifiers in said inverter comprises three pairs of SCRs arranged in a bridge configuration for converting a DC input voltage signal into three-phase AC output voltage signals, and wherein each of said three pairs of SCRs has a gate controlled commutation SCR associated therewith for turning off its associated SCR when a commutation pulse is received on the gate of said commutation SCR.

11. An inverter controller as set forth in claim 10, wherein said read only memory means comprises first and second next main SCR ROMs, each connected to receive said address information on said address bus for respectively providing first and second sets of three bit output signals, said first set of three bit output signals representing the next state desired for one SCR in each of said three pairs of SCRs, said second set of three bit output signals representing the next state desired for other SCR in each of said three pairs of SCRs.

12. An inverter controller as set forth in claim 11, wherein said second register means comprises first and second main SCR registers each enabled by a second timing signal for respectively receiving said first and second sets of three bit output signals from said first and second main SCR ROMs, the six bits of output signals from said first and second main SCR registers comprising said signals for the gate controlled rectifiers of said inverter.

13. An inverter controller as set forth in claim 12, wherein certain of said addressable locations in said read only memory means has information pertaining to permissible times for changing modes of said inverter, said certain addressable locations being addressable by said address information on said address bus to generate a one bit enable mode change signal which is received by said second register means for transmission to said mode control register means upon receipt by said second register means of certain of said second timing signals.

14. An inverter controller as set forth in claim 13, wherein said read only memory means further comprises a next commutate SCR ROM connected to receive said address information on said address bus for providing a third set of three bit output signals that represent the next state desired for the six commutation SCRs of said inverter.

15. An inverter controller as set forth in claim 14, wherein said second register means further comprises a commutation SCR register enabled by a fourth timing signal for receiving said third set of three bit output signals.

16. An inverter controller as set forth in claim 15, wherein said commutation SCR register comprises a decoder for translating said third set of three bit output signals from said next commutation SCR ROM into six gate control signals, one for each of said six commutation SCRs in said inverter.

17. The inverter controller of claim 15 wherein said means for receiving clock signals and for generating a plurality of timing signals comprises:
    means for receiving a first clock signal which is six times the desired inverter output frequency and for receiving a second clock signal;
    counter means for generating a series of address codes in accordance with said second clock signal;
    memory means having a plurality of addressable locations certain of which contain timing data, said locations addressed by said series of address codes for producing said timing signals each time said certain memory locations are addressed; and
    timing register means connected to said memory means for producing said timing signals as outputs upon receipt of said second clock signal, wherein said timing signals include said first, second and fourth timing signals.

18. The inverter controller of claim 12 wherein said means for receiving clock signals and for generating a plurality of timing signals comprises:
    means for receiving a first clock signal which is six times the desired inverter output frequency and for receiving a second clock signal;
    counter means for generating a series of address codes in accordance with said second clock signal;
    memory means having a plurality of addressable locations certain of which contain timing data, said locations addressed by said series of address codes for producing said timing signals each time said certain memory locations are addressed; and
    timing register means connected to said memory means for producing said timing signals as outputs upon receipt of said second clock signal, wherein said timing signals include said first and second timing signals.

19. The inverter controller of claim 3 wherein said means for receiving clock signals and for generating a plurality of timing signals comprises:
    means for receiving a first clock signal which is six times the desired inverter output frequency and for receiving a second clock signal;
    counter means for generating a series of address codes in accordance with said second clock signal;
    memory means having a plurality of addressable locations certain of which contain timing data, said locations addressed by said series of address codes for producing said timing signals each time said certain memory locations are addressed; and
    timing register means connected to said memory means for producing said timing signals as outputs upon receipt of said second clock signal, wherein one of said timing signals comprises said first timing signal.

20. The inverter controller of claim 2 wherein said means for receiving clock signals and for generating a plurality of timing signals comprises:
    means for receiving a first clock signal which is six times the desired inverter output frequency and for receiving a second clock signal; and
    means responsive to said first and second clock signals for generating said plurality of timing signals which begin in response to said first clock signal and which are spaced in time in accordance with said second clock signal.

21. The inverter controller of claim 20 wherein said means responsive to said first and second clock signals further includes:
    counter means for generating a series of address codes in accordance with said second clock signal; and
    memory means having a plurality of addressable locations certain of which contain timing data, said locations addressed by said series of address codes for producing said timing signals each time said certain memory locations are addressed.

22. The inverter controller of claim 21 further comprising timing register means connected to said memory means for producing said timing signals as outputs upon receipt of said second clock signal.

23. The inverter controller of claim 22 wherein said means for generating a plurality of timing signals includes means for resetting said counter means in response to a timing sequence terminate signal received from said timing register means.

24. An inverter controller as set forth in claim 1, further comprising gate means for disabling said gate controlled rectifier signals in response to an inhibit signal.

25. An inverter controller as set forth in claim 24, further comprising means for detecting when said conduction controlled rectifiers are reverse biased and for producing a gate inhibit signal in response thereto which is fed to said means for disabling said rectifier signals.

* * * * *